United States Patent Office 3,413,248
Patented Nov. 26, 1968

3,413,248
POLYGLYCIDYL ETHERS AND PROCESS FOR THEIR PRODUCTION
William M. Kraft, Verona, and Edward G. Janusz, Wallington, N.J., assignors to Tenneco Chemicals, Inc., a corporation of Delaware
No Drawing. Continuation-in-part of application Ser. No. 110,876, May 18, 1961. This application Apr. 23, 1965, Ser. No. 450,507
11 Claims. (Cl. 260—18)

ABSTRACT OF THE DISCLOSURE

Polyglycidyl ethers of terpene-phenol condensation products that have hydroxyl contents of 2.5% to 4.8%, oxirane contents of 1.5% and 2.7%, and combined hydroxyl and oxirane contents of 4.5% to 7.0% are reacted with dicarboxylic acids and optionally monocarboxylic acids to form resins that are valuable in the production of surface-coating compositions that are characterized by excellent gloss and gloss retention, hardness, flexibility, impact strength, and resistance to chemicals and to water.

This is a continuation-in-part of copending patent application Ser. No. 110,876, which was filed on May 18, 1961, now abandoned.

This invention relates to a new group of resinous products. More particularly, it relates to novel chain-extended polyglycidyl ethers of terpene-phenol condensation products and to a process for their production. It further relates to surface-coating compositions that are derived from these polyglycidyl ethers.

Copending patent application Ser. No. 107,309, which was filed on May 3, 1961 by William M. Kraft and Roy T. Gottesman, now abandoned, discloses a group of polyglycidyl ethers of terpene-phenol condensation products that can be used to form polyepoxide resin compositions having excellent hardness, chemical resistance, and other properties. Of particular importance as polyepoxide resin ingredients are the relatively high molecular weight, high melting polyglycidyl ethers that have hydroxyl contents between 2.5% and 4.8%, oxirane contents between 1.5% and 2.7%, and combined hydroxyl contents and oxirane contents between 4.5% and 7.0%. These ethers can be esterified with monocarboxylic acids or modified with polyamides to form products that are of value in a number of applications. Because the surface coatings prepared from these ethers tend to be brittle, they are often unsatisfactory for use in those applications, such as metal coatings, floor finishes, marine finishes, maintenance paints, and the like, where durable flexible films are required.

In accordance with the present invention, it has been discovered that the polyglycidyl ethers of terpene-phenol condensation products that are disclosed in the aforementioned copending patent application can be converted to resins that have a combination of properties that makes them valuable in the preparation of durable, flexible surface-coating compositions by increasing their chain length. This can be accomplished by treating the polyglycidyl ether with a compound having functional groups that will react with the terminal oxirane groups of the polyglycidyl ether. Particularly advantageous results have been obtained when the polyglycidyl ether of a terpene-phenol condensation product has been reacted with a polycarboxylic acid to form a chain-extended polyglycidyl ether that is a polyhydric polyester having terminal oxirane groups.

The reaction by which the chain-extended polyglycidyl ethers of the present invention are prepared may be demonstrated by the following equation:

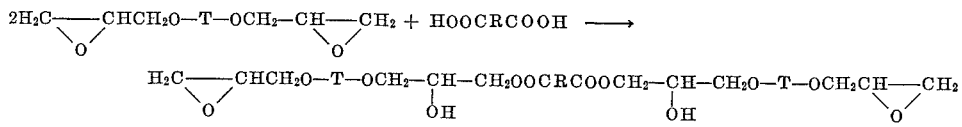

In this equation

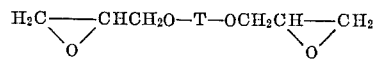

represents a polyglycidyl ether of a terpene-phenol condensation product, and R represents the hydrocarbon residue or substituted hydrocarbon residue of a dicarboxylic acid. This equation demonstrates the formation of a chain-extended polyglycidyl ether by the reaction of two molecules of a polyglycidyl ether with one molecule of a dicarboxylic acid. It is to be understood, however, that the invention is not limited to the use of these relative amounts of the reactants. As is indicated hereinafter, other amounts of the dicarboxylic acid can be reacted with the polyglycidyl ether to form the chain-extended polyglycidyl ethers of the present invention. In general higher molecular weight products are obtained when relatively larger amounts of the acid are used.

The chain-extended polyglycidyl ethers of this invention may be used in the preparation of a wide variety of air-dried or baked marine, maintenance, wood, metal, and industrial finishes in which they provide the outstanding advantages of superior chemical resistance, excellent flexibility and abrasive resistance, good solvent miscibility, and alkyd resin compatibility. In addition they can in a one-component coating system provide the superior film properties heretofore associated with two-component reactive systems, such as polyurethane-polyester systems and polyepoxide-polyamide systems.

The polyglycidyl ethers that are used as the starting material in the preparation of the novel resinous products are polyglycidyl ethers of terpene-phenol condensation products that have hydroxyl contents between 2.5% and 4.8%, oxirane contents between 1.5% and 2.7%, and combined hydroxyl and oxirane contents between 4.5% and 7.0%.

These polyglycidyl ethers may be prepared by the following series of reactions: (1) A terpene, such as dipentene, limonene, α-pinene, terpinolene, α-terpineol, cineole, and mixtures thereof, is contacted with phenol or an alkylphenol having from 1 to 3 alkyl groups, each containing from 1 to 4 carbon atoms, in the amount of approximately 2.25 moles to 10 moles and preferably 3 moles to 5 moles of the phenol per mole of the terpene at a temperature between −10° C. and 15° C. and in the presence of a boron trifluoride or concentrated sulfuric acid catalyst to form a terpene-phenol condensation product having a hydroxyl content of 7.5% to 8.0% and a molecular weight in the range of 330 to 360; and (2) this terpene-phenol condensation product is reacted with a halohydrin, such as epichlorohydrin, and an alkali metal hydroxide, such as sodium hydroxide, in the amounts of approximately 1 mole to 3 moles of halohydrin and 1.2 moles to 2.4 moles of alkali metal hydroxide per mole of the condensation product at a temperature in the range of 20° C. to 180° C. and preferably 60° C. to 110° C. to form a polyglycidyl ether having hydroxyl and oxirane contents in the aforementioned ranges. The preparation of the polyglycidyl ethers is described in detail in copending patent application Ser. No. 107,309, which disclosure is incorporated herein by reference.

A wide variety of polycarboxylic acids may be used in the practice of this invention. These include saturated and unsaturated aliphatic, aromatic, and cycloaliphatic dicarboxylic and tricarboxylic acids having from 4 to 42 carbon atoms. One group of useful acids includes the saturated aliphatic dicarboxylic acids having from 4 to 10 carbon atoms, for example, succinic acid, methylsuccinic acid, glutaric acid, adipic acid, pimelic acid, suberic acid, azelaic acid, and sebacic acid. Another group includes aromatic polycarboxylic acids, such as phthalic acid, chlorophthalic acid, isophthalic acid, terephthalic acid, trimellitic acid, trimesic acid, and pyromellitic acid. Surface-coating compositions having a particular useful combination of properties result when the polyglycidyl ether is reacted with dimerized drying oil and semi-drying oil fatty acids. These acids are the aliphatic dicarboxylic acids that are the bimolecular addition products of conjugated or unconjugated dienoic or trienoic fatty acids having from 6 to 22 carbon atoms before polymerization and that contain small amounts of tricarboxylic acids resulting from the trimerziation of the aforementioned acids. Representative of the dimerized acids that may be used in the practice of the present invention are dimers of sorbic acid, linoleic acid, eicosnic acid, linolenic acid, eleostearic acid, and erucic acid. Particularly preferred are acids prepared by the dimerization of unsaturated acids that have 18 carbon atoms. Illustrative of these acids are the dimerized linoleic acid products marketed as "Empol Dimer Acids." Typical of these products are Empol 1014, Empol 1022, and Empol 1024 of which the following are average analyses:

|  | Empol 1014 | Empol 1022 | Empol 1024 |
|---|---|---|---|
| Monomeric acids, percent | 1 | 7 | 4 |
| Dimer acids, percent | 95 | 73 | 73 |
| Trimer acids, percent | 4 | 20 | 23 |
| Molecular weight | 584–660 | 578–600 | 578–600 |

The term "dimerized fatty acids" as used herein is to be understood to include those products containing a major amount of dimerized fatty acids and a minor amount of trimerized fatty acids. The term "polycarboxylic acids, as used herein includes dicarboxylic acids, tricarboxylic acids, and the anhydrides of these acids. A single polycarboxylic acid or a mixture of two or more of these acids can be used in the practice of this invention.

The properties of the surface coatings prepared from the chain-extended polyglycidyl ethers depend to some extent upon the choice of the polycarboxylic acid. For example, more flexible products are obtained when dimerized fatty acids or other long chain dicarboxylic acids are used, whereas harder, more durable films result when short chain aliphatic dicarboxylic acids or aromatic polycarboxylic acids are used.

In the practice of the present invention amounts of the reactants are used that will provide approximately 1 to 3 equivalents and preferably 1.2 to 2 equivalents (based on the oxirane contents) of the polyglycidyl ether per equivalent of the polycarboxylic acid. Since the polyglycidyl ether contains hydroxyl groups as well as oxirane groups, the amounts of the reactants may also be expressed as approximately 0.15 to 0.30 equivalent and preferably 0.17 to 0.25 equivalent of the polycarboxylic acid per esterification equivalent of the polyglycidyl ether. The esterification equivalent, which is the amount of the ether that will react with one equivalent of a carboxylic acid, may be calculated by means of the following equation:

$$\frac{1700}{(2.125 \times \text{percent Oxirane}) + (\text{percent Hydroxyl})} = \text{Esterification Equivalent}$$

Any suitable and convenient procedure may be used for the preparation of the chain-extended polyglycidyl ethers of this invention. For example, the polyglycidyl ether of a terpenephenol condensation product may be heated with the polycarboxylic acid at a temperature between approximately 100° C. and 300° C. and preferably between 140° C. and 180° C., until the esterification is complete. While the esterification reaction is usually carried out in the absence of a solvent, a solvent in which the product is soluble, for example, toluene, xylene, butanol, methyl, isobutyl ketone, butyl acetate, mineral spirits, and mixtures thereof, may be used. The resulting chain-extended polyglycidyl ethers may be used alone or in combination with amines or polyamides in surface-coating compositions that can be baked to form hard, durable, chemically-resistant coatings.

In another embodiment of this invention, the chain-extended polyglycidyl ethers may be further esterified with monocarboxylic acids to form air-drying surface-coating compositions. These products may be prepared by heating the chain-extended polyglycidyl ether with a monocarboxylic acid at a temperature between 200° C. and 300° C. and preferably between 240° C. and 270° C. until the resulting product has an acid number below 20 and preferably below 10. This esterification is generally carried out in the presence of a hydrocarbon solvent, such as xylene or mineral spirits, in which the product is soluble.

The monocarboxylic acids that may be used in this esterification step include the aliphatic straight-chain and branched-chain acids that contain from 4 to 22 carbon atoms. These acids may be saturated, or they may contain ethylene unsaturation. Also useful are mononuclear and polynuclear aromatic monocarboxylic acids. Illustrative of these acids are butyric acid, 2-ethylhexanoic acid, lauric acid, stearic acid, oleic acid, linoleic acid, arcylic acid, methacrylic acid, crotonic acid, abietic acid, benzoic acid, toluic acid, salicylic acid, and cresotinic acid. A single monocarboxylic acid or a mixture of these acids may be used. Drying oil fatty acids and semi-drying oil fatty acids, which are mixtures of monocarboxylic acids, are the preferred monocarboxylic acids. These include linseed oil fatty acids, soybean oil fatty acids, tall oil fatty acids, cottonseed oil fatty acids, dehydrated castor oil fatty acids, and the like. Monomer-modified drying oil and semi-drying oil fatty acids, such as styrenated fatty acids, and mixtures of fatty acids and aromatic acids, for example, dehydrated castor oil fatty acids and benzoic acid, may also be used.

The amount of monocarboxylic acid used in most cases is approximately 20% to 90% of the amount that will react with all of the hydroxyl groups and oxirane groups of the chain-extended polyglycidyl ether. That is, approximately 0.20 to 0.90 equivalent of the monocarboxylic acid is used per esterification equivalent of the chain-extended polyglycidyl ether. When less than the specified amount of monocarboxylic acid is used, the esters tend to be brittle and to form surface-coatings that are not durable. The use of more than this amount of monocarboxylic acid often has a deleterious effect on the hardness and alkali resistance of surface-coating compositions formed from the esters.

The air-drying products of this invention may also be prepared by a one-step procedure in which a mixture of a polyglycidyl ether of a terpene-phenol condensation product, a polycarboxylic acid, and a monocarboxylic acid is heated at a temperature between 200° C. and 300° C. and preferably between 240° C. and 270° C. until the resulting product has an acid number below 20. The reactants used in this one-step procedure are the same as those used in the aforesaid two-step procedure. To obtain products having the desired combination of properties 0.15 to 0.3 and preferably 0.17 to 0.25 equivalent of the polycarboxylic acid and 0.2 to 0.7 equivalent of the monocarboxylic acid are used for each esterification equivalent of the polyglycidyl ether. This reaction is ordinarily, but not necessarily, carried out in the presence of an inert hydrocarbon solvent, such as xylene or mineral spirits, in which the product is soluble.

Surface-coating compositions may be prepared by dissolving the chain-extended polyglycidyl ether esters in an inert solvent, for example, toluene, xylene, benzene, mineral spirits, methyl isobutyl ketone, butanol, and the like, or in a mixture of such solvents. The amount of solvent used is that which will provide a solution of the desired viscosity. In addition the surface-coating compositions may contain other ingredients, such as fillers, pigments, dyes, plasticizers, bodying agents, driers, and the like in amounts ordinarily used for the purposes specified. They may also contain other resinous materials, such as alkyd resins, polyamides, urea-aldehyde resins, and phenolic resins.

Surface-coating compositions containing the monocarboxylic acid esters of the chain-extended polyglycidyl ethers are characterized by excellent gloss and gloss retention, hardness, resistance to chemicals and to water, impact strength, and flexibility. In addition on exposure to ultraviolet radiation they yellow to a lesser degree than do the corresponding esters prepared from polyglycidyl ethers derived from 2,2-bis (4-hydroxyphenyl)-propane.

The invention is further illustrated by the examples that follow. In these examples, all parts and percentages are parts by weight and percentages by weight unless otherwise specified.

EXAMPLE 1

The following is a typical procedure for the preparation of the polyglycidyl ethers of terpene-phenol condensation products that are used as the starting materials in the preparation of the chain-extended polyglycidyl ethers of this invention:

A mixture of 846 grams (9.0 moles) of phenol, 750 ml. of benzene, and 34 grams (0.235 mole) of boron trifluoride diethyl etherate was cooled to 5° C. To this mixture was added 272 grams (2.0 moles) of dipentene over a period of 90 minutes during which time the mixture was agitated constantly and maintained at 5° C. The reaction mixture was stirred at 5° C. for two hours after which 300 ml. of water was added to it. The organic layer that formed was separated, washed, with four 500 ml. portions of water, and then distilled under atmospheric pressure to remove the benzene. The residue was distilled under reduced pressure to remove unreacted phenol and other volatile materials. The resulting dipentene-phenol condensation product, which weighed 508.5 grams, was a pale yellow glass that had a hydroxyl content of 7.68% and a molecular weight of 340.

Two hundred grams (0.59 mole) of this dipentene-phenol condensation product was heated with 396.2 grams (0.99 mole) of a 10% aqueous sodium hydroxide solution and 400 ml. of toluene at the reflux temperature of the mixture until the dipentene-phenol condensation product had dissolved and then cooled to 45° C. To this solution was added rapidly 83.4 grams (0.90 mole) of epichlorohydrin. The reaction mixture was heated at its reflux temperature for 90 minutes. Following the addition of 200 ml. of toluene, the reaction mixture was allowed to separate into aqueous and organic layers. The aqueous layer was separated and discarded. The organic layer was washed with 30 ml. portions of a saturated aqueous salt solution until the aqueous wash solution had a pH of approximately 7. The toluene solution was heated at its reflux temperature to remove the water that was present, filtered, and then heated at 160° C. at 10 mm. to remove the toluene. The residue, which weighed 220 grams, was a hard, brittle amber solid. This polyglycidyl ether of the dipentene-phenol condensation product had an oxirane content of 2.22% and a hydroxyl content of 3.85%.

EXAMPLE 2

A chain-extended polyglycidyl ether of a dipentene-phenol condensation product was prepared by heating 80 grams of the product of Example 1 with 16.1 grams of dimerized fatty acids (Empol 1022) at 160° C. for 3 hours. This product was a brittle solid which had an oxirane content of 1.24%, a hydroxyl content of 3.27%, and a softening point (Stroock and Wittenberg Mercury Method) of 88–92° C.

EXAMPLE 3

A mixture of 53.5 grams of the product of Example 1 was heated with 15.6 grams of dimerized fatty acids (Empol 1022) at 160° C. for 3 hours to form a chain-extended polyglycidyl ether of a dipentene-phenol condensation product which had an oxirane content of 1.04% and a hydroxyl content of 3.43%.

EXAMPLE 4

Sixty grams of the product of Example 3 was heated with 40.1 grams of soybean oil fatty acids and 5 grams of mineral spirits at 260° C. for 8.5 hours. The esterified product had an acid number of 9.0 and a Gardner-Holdt viscosity (50% solids in mineral spirits) of N–O.

EXAMPLE 5

A mixture of 58.1 grams of a polyglycidyl ether of a dipentene-phenol condensation product which was prepared by the procedure described in Example 1 and which had a hydroxyl content of 3.76% and an oxirane content of 2.26%, 25 grams of dehydrated castor oil fatty acids, 16.9 grams of dimerized fatty acids (Empol 1022), and 4 grams of xylene was heated at 260° C. for 5 hours. The resulting esterified chain-extended polyglycidyl ether had an acid number of 1.3 and a Gardner-Holdt viscosity (50% solids in xylene) of Z+.

EXAMPLE 6

A mixture of 58.1 grams of a polyglycidyl ether of a dipentene-phenol condensation product which was prepared by the procedure described in Example 1 and which had a hydroxyl content of 3.76% and an oxirane content of 2.26%, 16.9 grams of dimerized fatty acids (Empol 1022), and 4 grams of xylene was heated at 260° C. for 30 minutes. Then 25 grams of dehydrated castor oil fatty acids was added, and the reaction mixture was heated at 260° C. for 4 hours. The esterified chain-extended polyglycidyl ester had an acid number of 0.7 and a Gardner-Holdt viscosity (50% solids in xylene) of W.

EXAMPLE 7

A mixture of 58.1 grams of a polyglycidyl ether of a dipentene-phenol condensation product which was prepared by the procedure described in Example 1 and which had a hydroxyl content of 3.76% and an oxirane content of 2.26%, 40.8 grams of dehydrated castor oil fatty acids, 15.6 grams of dimerized fatty acids (Empol 1022), and 4 grams of xylene was heated at 260° C. for 4.5 hours. The esterified product had an acid number of 1.3 and a Gardner-Holdt viscosity (50% solids in xylene) of X–Y.

EXAMPLE 8

A mixture of 53.6 grams of a polyglycidyl ether of a dipentene-phenol condensation product which was prepared by the procedure described in Example 1 and which had a hydroxyl content of 3.76% and an oxirane content of 2.26%, 15.6 grams of dimerized fatty acids (Empol 1022), and 4 grams of xylene was heated at 260° C. for 20 minutes. Then 30.8 grams of dehydrated castor oil fatty acids was added, and the reaction mixture was heated at 260° C. for 4 hours. The esterified product had an acid number of 5.9 and a Gardner-Holdt viscosity (50% solids in xylene) of T.

EXAMPLE 9

Solutions of the products of Examples 5 to 8 (50% solids in xylene) were cast onto glass plates. The resulting films were air-dried or baked and then evaluated by the test methods ordinarily employed in the surface-coatings field. For comparative purposes, a corresponding ester prepared from dehydrated castor oil fatty acids and a 2,2-bis (4-hydroxyphenyl)-propane polyglycidyl ether having an epoxide equivalent weight of 870–1025 was included in the tests.

The results of the tests are given in Table I.

EXAMPLE 10

A mixture of 66.1 grams of a polyglycidyl ether of a dipentene-phenol condensation product which was prepared by the procedure described in Example 1 and which had a hydroxyl content of 3.76% and an oxirane content of 2.26% and 5.5 grams of isophthalic acid was heated at 240°–245° C. for 30 minutes. Then 28.4 grams of dehydrated castor oil fatty acids and 4 grams of xylene was added and the reaction mixture was heated at 260° C. for 3.3 hours. The product had an acid number of 0.5 and a Gardner-Holdt viscosity (50% solids in xylene) of U–V.

EXAMPLE 11

A mixture of 60.3 grams of a polyglycidyl ether of a dipentene-phenol condensation product which was prepared by the procedure described in Example 1 and which had a hydroxyl content of 3.76% and an oxirane content of 2.26%, 5.0 grams of isophthalic acid, 34.7 grams of dehydrated castor oil fatty acids, and 4 grams of xylene was heated at 260° C. for 4 hours. The product had an acid number of 1.6 and a Gardner-Holdt viscosity (50% solids in xylene) of J.

EXAMPLE 12

A mixture of 60.7 grams of a polyglycidyl ether of a dipentene-phenol condensation product which was prepared by the procedure described in Example 1 and which had a hydroxyl content of 3.76% and an oxirane content of 2.26%, 4.5 grams of adipic acid, 34.8 grams of dehydrated castor oil fatty acids, and 4 grams of xylene was heated at 260° C. for 3.5 hours. The product had an acid number of 2.3 and a Gardner-Holdt viscosity (50% solids in xylene) of V.

EXAMPLE 13

A mixture of 60.7 grams of a polyglycidyl ether of a dipentene-phenol condensation product which was prepared by the procedure described in Example 1 and which had a hydroxyl content of 3.76% and an oxirane content of 2.26%, 34.7 grams of dehydrated castor oil fatty acids,

TABLE I

| Ester | Product of Ex. 5 | Product of Ex. 6 | Product of Ex. 7 | Product of Ex. 8 | Comparative Ester |
|---|---|---|---|---|---|
| Air Dried Films (0.04% Co as Drier); Drying Time (min.) | 90 | 88 | 130 | 104 | 101 |
| Sward Hardness | | | | | |
| 1 day | 32 | 32 | 20 | 22 | 10 |
| 28 Days | 54 | 54 | 54 | 54 | 46 |
| Flexibility (using 1/8" mandrel) | Pass | Pass | Pass | Pass | Pass |
| Water Resistance: | | | | | |
| Hot Water | Slight blush; Recovers 10 min | Slight blush; Recovers 15 min | Very slight blush; Recovers 10 min | Slight blush; Recovers 10 min | Bad blush; Recovers 35 min |
| Cold Water | No effect | No effect | Very slight effect | Very slight effect | Considerable effect |
| Alkali Resistance (Hours to Denude): | | | | | |
| 3% NaOH | >3,000 | >3,000 | 3,000 | 3,000 | 1,140 |
| 10% NaOH | >3,000 | >3,000 | 2,496 | 2,184 | 312 |
| 1% Tide | 2,815 | 3,000 | 1,663 | 936 | 960 |
| Baked Films (1 hour at 150° C. without driers): | | | | | |
| Sward Hardness: | | | | | |
| 1 Hour | 56 | 58 | 40 | 48 | 40 |
| 24 Hours | 58 | 58 | 40 | 48 | 44 |
| Flexibility (using 1/8" mandrel) | Pass | Pass | Pass | Pass | Pass |
| Water Resistance: | | | | | |
| Hot water | Bad blush; No recovery | Slight blush; No recovery | Very slight blush; Recovers | Slight blush; Recovers | Slight blush; Recovers |
| Cold water | No effect | No effect | No effect | No effect | Slight blush |
| Alkali Resistance (Hours to Denude): | | | | | |
| 3% NaOH | >3,000 | >3,000 | >3,000 | >3,000 | 2,784 |
| 10% NaOH | >3,000 | >3,000 | >3,000 | >3,000 | 648 |
| 1% Tide | >3,000 | 2,728 | >3,000 | 1,920 | 270 |

5.8 grams of azelaic acid, and 4 grams of xylene was heated at 55° C. for 4.5 hours. The product had an acid number of 2.6 and a Gardner-Holdt viscosity (50% solids in xylene) of V+.

EXAMPLE 14

A mixture of 60.7 grams of a polyglycidyl ether of a dipentene-phenol condensation product which was prepared by the procedure described in Example 1 and which had a hydroxyl content of 3.76% and an oxirane content of 2.26%, 8.2 grams of dodecenyl succinic anhydride, 34.8 grams of dehydrated castor oil fatty acids, and 4 grams of xylene was heated at 255° C. for 4.5 hours. The product had an acid number of 2.0 and a Gardner-Holdt viscosity (50% solids in xylene) of R.

EXAMPLE 15

Air-dried films prepared from the products of Examples 10 to 14 were evaluated with the following results:

TABLE II

| Ester | Product of Ex. 10 | Product of Ex. 11 | Product of Ex. 12 | Product of Ex. 13 | Product of Ex. 14 |
|---|---|---|---|---|---|
| Dicarboxylic Acid Used in Preparation of the Ester | (1) | (1) | (2) | (3) | (4) |
| Drying Time (minutes) | 20 | 33 | 40 | 70 | 68 |
| Sward Hardness: | | | | | |
| 1 Day | 32 | 22 | 20 | 20 | 30 |
| 28 Days | 60 | 64 | 52 | 60 | 64 |
| Flexibility (using 1/8" mandrel) | (5) | (5) | (6) | (6) | (5) |
| Alkali Resistance (Hours to Denude): | | | | | |
| 3% NaOH | 2,136 | 2,112 | >3,000 | >3,000 | >3,000 |
| 10% NaOH | 1,157 | 1,208 | 2,808 | 1,776 | 821 |
| 1% Tide | 4,628 | 1,608 | 3,168 | 1,680 | 2,641 |

1 Isophthalic Acid.
2 Adipic Acid.
3 Azelaic Acid.
4 Dodecenyl Succinic Anhydride.
5 Failed.
6 Passed.

EXAMPLE 16

A mixture of 54.5 grams of a polyglycidyl ether of an α-pinene-phenol condensation product which was prepared by the procedure described in Example 1 and which had a hydroxyl content of 4.45% and an oxirane content of 2.10% and 12.9 grams of dimerized fatty acids (Empol 1022) was heated at 160° C. for 3 hours. Then 32.6 grams of dehydrated castor oil fatty acids and 5 grams of mineral spirits were added, and the reaction mixture was heated at 260° C. for 3.5 hours. The product had an acid number of 3.9 and a Gardner-Holdt viscosity (50% solids in mineral spirits) of R.

EXAMPLE 17

A mixture of 46.2 grams of a polyglycidyl ether of a dipentene-phenol condensation product which had been prepared by the procedure described in Example 1 and which had a hydroxyl content of 3.76% and an oxirane content of 2.26%, 40.4 grams of tall oil fatty acids, 13.4 grams of dimerized fatty acids (Empol 1022), and 4 grams of xylene was heated at 255°–260° C. for 6 hours. The product had an acid number of 8.2 and a Gardner-Holdt viscosity (50% in mineral spirits) of J.

EXAMPLE 18

A mixture of 56.2 grams of a polyglycidyl ether of a dipentene-phenol condensation product which had been prepared by the procedure described in Example 1 and which had a hydroxyl content of 3.85% and an oxirane content of 2.22% and 11.3 grams of dimerized fatty acids (Empol 1024) was heated at 160° C. for 1 hour. Then 32.5 grams of dehydrated castor oil fatty acids and 4 grams of xylene were added, and the reaction mixture was heated at 260° C. for 3 hours. The product had an acid number of 2.0 and a Gardner-Holdt viscosity (50% solids in mineral spirits) of Z.

EXAMPLE 19

A mixture of 46.3 grams of a polyglycidyl ether of a limonene-phenol condensation product which had been prepared by the procedure described in Example 1 and which had a hydroxyl content of 3.40% and an oxirane content of 2.46% and 13.6 grams of dimerized fatty acids (Empol 1022) was heated at 160° C. for 3 hours. Then 20.1 grams of soybean oil fatty acids, 20.1 grams of tall oil fatty acids, and 5 grams of mineral spirits were added, and the reaction mixture was heated at 260° C. for 6.5 hours. The product had an acid number of 10 and a Gardner-Holdt viscosity (50% solids in mineral spirits) of T–U.

EXAMPLE 20

A mixture of 42.9 grams of a polyglycidyl ether of a dipentene-phenol condensation product which was prepared by the procedure described in Example 1 and which had a hydroxyl content of 3.85% and an oxirane content of 2.22% and 12.5 grams of dimerized fatty acids (Empol 1022) was heated at 160° C. for 3 hours. Then 37.1 grams of soybean oil fatty acids, 7.5 grams of rosin, and 5 grams of mineral spirits were added, and the reaction mixture was heated at 270° C. for 8.5 hours. The product had an acid number of 10 and a Gardner-Holdt viscosity (50% solids in mineral spirits) of K. Air-dried films of this product and of the corresponding commercially available ester prepared from soybean oil fatty acids, rosin, and a 2,2-bis (4-hydroxyphenyl)-propane glycidyl ether having an epoxide equivalent weight of 870–1025 were evaluated. The results are given in Table III.

TABLE III

| Ester | Product of Ex. 20 | Comparative Ester |
|---|---|---|
| Drying Time (Hours:Minutes) | 3:15 | 3:32 |
| Sward Hardness: | | |
| 1 Day | 34 | 28 |
| 28 Days | 68 | 62 |
| Flexibility (using 1/8" mandrel) | (1) | (1) |
| Water Resistance: | | |
| Hot Water | (2) | (3) |
| Cold Water | (4) | (5) |
| Alkali Resistance (Hours to Denude): | | |
| 3% NaOH | 576 | 384 |
| 1% Tide | 264 | 168 |

1 Pass.
2 Very Slight Effect, Recover 15 minutes.
3 Very Slight Effect, Recover 35 minutes.
4 Very Slight Effect, Recover 10 minutes.
5 Considerable Effect, Recover 30 minutes.

EXAMPLE 21

A mixture of 81 grams of a polyglycidyl ether of an α-pinene-phenol condensation product which was prepared by the procedure described in Example 1 and which had a hydroxyl content of 3.48% and an oxirane content of 2.02% and 14.8 grams of dimerized fatty acids (Empol 1014) was heated at 159°–165° C. for 3 hours. The resulting chain-extended polyglycidyl ether was a brittle solid which had an oxirane content of 1.26%, a hydroxyl content of 3.25%, and a softening point (Stroock and Wittenberg Mercury Method) of 72°–78° C.

EXAMPLE 22

A mixture of 85 grams of a polyglycidyl ether of an α-pinene-phenol condensation product which was prepared by the procedure described in Example 1 and which had an oxirane content of 2.2% and 5.5 grams of azelaic acid was heated at 150°–170° C. for 3 hours. The resulting chain-extended polyglycidyl ether had an oxirane content of 1.08%, a hydroxyl content of 3.67%, and a softening point (Stroock and Wittenberg Mercury Method) of 93°–96° C.

EXAMPLE 23

A mixture of 80 grams of a polyglycidyl ether of a dipentene-phenol condensation product which was prepared by the procedure described in Example 1 and which had a hydroxyl content of 3.85% and an oxirane content of 2.22% and 4.1 grams of adipic acid was heated at 160° C. for 3 hours. The resulting chain-extended polyglycidyl ether had an oxirane content of 0.97%, a hydroxy content of 4.5%, and a softening point (Stroock and Wittenberg Mercury Method) of 113°–115° C.

EXAMPLE 24

A resinous composition was prepared by mixing 38.7 grams of the product of Example 2 with a polyamide which was prepared from diethylene triamine and dimerized fatty acid, which contained 9.6% of nitrogen, and which had an amine number of 206 with 38.7 grams of a solvent mixture which contained equal weights of xylene, methyl isobutyl ketone, and ethylene glycol monoethyl ether. Air-dried and baked films prepared from this composition were hard, flexible, and resistant to attack by water, alkalies, and solvents.

EXAMPLE 25

A mixture of 66.7 parts of a dipentene-phenol condensation product which was prepared by the procedure described in Example 1 and which had a hydroxyl content of 3.5% and an oxirane content of 1.2%, 33.3 parts of dehydrated castor oil fatty acids, and 4 parts of xylene was heated at 260° C. for 4 hours. The resulting esterified chain-extended polyglycidyl ether had an acid number of 5 and a Gardner-Holt viscosity (50% solids in xylene) of T–U.

EXAMPLE 26

A paint was prepared by grinding 116 parts of the product of Example 25 with 275 parts of titanium dioxide (Titanox RA–NC) and 2 parts of a bodying agent (Bentone 34) on a 3-roll mill until a 7+ North Standard grind was achieved and then adding to it another 426 parts of the product of Example 25, 138 parts of naphtha, 1.8 parts of cobalt tallate, and 2.7 parts of guaiacol.

For comparative purposes equivalent paints were prepared from other resin systems. The paints were then evaluated by standard test methods. The results obtained are summarized in Table IV.

this invention, esters of dipentene-phenol glycidyl ethers which were similar except for the fact that one was modified with dimerized fatty acids prior to esterification with fatty acids were prepared and evaluated as surface-coating compositions.

These esters were prepared as follows:

Ex. No. 27–A (ester of chain-extended-polyglycidyl ether)

A mixture of 53.6 grams of a polyglycidyl ether of a dipentene-phenol condensation product which was prepared by the procedure described in Example 1 and which had a hydroxyl content of 3.76% and an oxirane content of 2.26% and 15.6 grams of dimerized fatty acids (Empol 1022) was heated at 260° C. for 30 minutes. Then 30.8 grams of dehydrated castor oil fatty acids was added, and the mixture was heated at 260° C. for 4 hours. The resulting ester of a chain-extended polyglycidyl ether of a dipentene-phenol condensation product had an acid number of 5.9 and a Gardner-Holdt viscosity (50% solids in xylene) of T.

Ex. No. 27–B (ester of polyglycidyl ether)

A mixture of 128.6 grams of the same polyglycidly ether that was used in Ex. No. 27–A and 71.4 grams of dehydrated castor oil fatty acids was heated at 260° C. for 4.5 hours to give an ester that had an acid number of 0.6 and a Gardner-Holdt viscosity (50% solids in xylene) of B–C.

Films of esters 27–A (a product of this invention) and 27–B (a comparative product) were prepared and evaluated. The results are given in Table V.

TABLE V

| Ester | Ex. No. 27–A (Ester of Chain-Extended Polyglycidyl Ether) | Ex. No. 27–B (Comparative Ester) |
| --- | --- | --- |
| Drying Time (Hours:Minutes) | 0:44 | 0:32 |
| Sward Hardness: | | |
| 1 Day | 22 | 34 |
| 28 Days | 54 | 60 |
| Flexibility | (¹) | (²) |
| Alkali Resistance (Hours to Denude): | | |
| 3% NaOH | 3,000 | 432 |
| 10% NaOH | 2,184 | 343 |
| 1% Tide | 936 | 1,008 |

¹ Pass ⅛″.
² Failed ½″.

From the data in Table V it will be seen that the product of this invention is equivalent to the comparative ester in drying properties and hardness and that it is far superior to the comparative ester in flexibility and alkali resistance.

The terms and expressions which have been employed are used as terms of description and not of limitation, and

TABLE IV

| Property | Product of Ex. 26 | Ester of Bisphenol Glycidyl Ether | Polyepoxide-polyamide | Polyurethane-polyester |
| --- | --- | --- | --- | --- |
| Recoatability | Excellent | Poor | Poor | Poor. |
| Alkali Resistance | Very good | Good | Excellent | Fair. |
| Water Resistance | Excellent | Fair | Good | Excellent. |
| Acid Resistance | do | Very good | Poor | Fair. |
| Through Dry in Air | do | Good | Good | Good. |
| Hardness | do | do | do | Excellent. |
| Hardness Development | do | Fair | do | Do. |
| Color Retention | Very good | Poor | Poor | Poor. |
| Gloss Retention | do | Good | do | Do. |
| Low Solvency Compatibility | Excellent | Very poor | Very poor | Very poor. |
| Alkyd Resin Compatibility | do | do | do | Do. |
| Flexibility | Good | Good | Good | Excellent. |
| Abrasion Resistance | do | Very good | do | Do. |
| Adhesion | Excellent | Excellent | do | Good. |

EXAMPLE 27

To demonstrate the improvement in properties that result from the modification of polyglycidyl ethers of terpene-phenol condensation products in accordance with there is no intention in the use of such terms and expressions of excluding any equivalents of the features shown and described or portions thereof, but it is recognized that various modifications are possible within the scope of the invention claimed.

What is claimed is:

1. The chain-extended polyglycidyl ether that is the product of the reaction of (a) a polyglycidyl ether of a terpenephenol condensation product having a hydroxyl content between 2.5% and 4.8%, an oxirane content between 1.5% and 2.7%, and a combined hydroxyl content and oxirane content between 4.5% and 7.0% and (b) a polycarboxylic acid selected from the group consisting of saturated aliphatic dicarboxylic acids having from 4 to 10 carbon atoms, aromatic polycarboxylic acids, dimerized drying oil and semi-drying oil fatty acids, and mixtures thereof in the amounts of 1 to 3 equivalents based on the oxirane content of said polyglycidyl ether per equivalent of said polycarboxylic acid.

2. The chain-extended polyglycidyl ether that is the product of the reaction of (a) polyglycidyl ether of a terpenephenol condensation product having a hydroxyl content between 2.5% and 4.8%, an oxirane content between 1.5% and 2.7%, and a combined hydroxyl content and oxirane content between 4.5% and 7.0% and (b) dimerized fatty acids in the amounts of 1 to 3 equivalents based on the oxirane content of said polyglycidyl ether per equivalent of said dimerized fatty acids.

3. The chain-extended polyglycidyl ether that is the product of the reaction of (a) a polyglycidyl ether of a dipentenephenol condensation product, said ether having a hydroxyl content between 2.5% and 4.8%, an oxirane content between 1.5% and 2.7%, and a combined hydroxyl content and oxirane content between 4.5% and 7.0%, and (b) dimerized fatty acids in the amount of 1.2 to 2.0 equivalents based on the oxirane content of said polyglycidyl ether per equivalent of said dimerized fatty acids.

4. The chain-extended polyglycidyl ether that is the product of the reaction of (a) a polyglycidyl ether of a dipentenephenol condensation product, said ether having a hydroxyl content between 2.5% and 4.8%, an oxirane content between 1.5% and 2.7%, and a combined hydroxyl content and oxirane content between 4.5% and 7.0%, and (b) adipic acid in the amount of 1.2 to 2.0 equivalents based on the oxirane content of said polyglycidyl ether per equivalent of said adipic acid.

5. The ester that is the product of the reaction of (a) a chain-extended polyglycidyl ether as defined in claim 1 with (b) a monocarboxylic acid in the amount of approximately 0.2 to 0.9 equivalent of said acid per esterification equivalent of said chain-extended polyglycidyl ether.

6. The ester that is the product of the reaction of (a) a chain-extended polyglycidyl ether as defined in claim 3 with (b) an aliphatic monocarboxylic acid having from 4 to 22 carbon atoms in the amount of approximately 0.2 to 0.9 equivalent of said acid per esterification equivalent of said chain-extended polyglycidyl ether.

7. The ester that is the product of the reaction of (a) a chain-extended polyglycidyl ether as defined in claim 3 with (b) a monocarboxylic acid selected from the group consisting of drying oil fatty acids, semi-drying oil fatty acids, and mixtures thereof in the amount of approximately 0.2 to 0.9 equivalent of said acid per esterification equivalent of said chain-extended polyglycidyl ether.

8. The ester that is the product of the reaction of (a) a chain-extended polyglycidyl ether as defined in claim 3 with (b) dehydrated castor oil fatty acids in the amount of 0.2 to 0.9 equivalent of said fatty acids per esterification equivalent of said chain-extended polyglycidyl ether.

9. The ester that is the product of the reaction of (a) a chain-extended polyglycidyl ether as defined in claim 3 with (b) soybean oil fatty acids in the amount of 0.2 to 0.9 equivalent of said fatty acids per esterification equivalent of said chain-extended polyglycidyl ether.

10. The polyglycidyl ether ester that is the product of the reaction of (a) a polyglycidyl ether of a dipentenephenol condensation product, said ether having a hydroxyl content between 2.5% and 4.8%, an oxirane content between 1.5% and 2.7%, and a combined hydroxyl content and oxirane content between 4.5% and 7.0%, (b) dimerized fatty acids, and (c) a monocarboxylic acid selected from the group consisting of drying oil fatty acids, semi-drying oil fatty acids, and mixtures thereof in the amounts of approximately 0.17 to 0.25 equivalent of said dimerized fatty acids and approximately 0.2 to 0.7 equivalent of said monocarboxylic acid per esterification equivalent of said polyglycidyl ether, said reaction being carried out by heating said polyglycidyl ether, dimerized fatty acids, and monocarboxylic acid together at a temperature between 200° C. and 300° C. until the product has an acid number below 20.

11. The polyglycidyl ether ester that is the product of the reaction of (a) a polyglycidyl ether of a dipentenephenol condensation product, said ether having a hydroxyl content between 2.5% and 4.8%, an oxirane content between 1.5% and 2.7%, and a combined hydroxyl content and oxirane content between 4.5% and 7.0%, (b) dimerized fatty acids, and (c) dehydrated castor oil fatty acids, in the amounts of approximately 0.17 to 0.25 equivalent of said dimerized fatty acids and approximately 0.2 to 0.7 equivalent of said dehydrated castor oil fatty acids per esterification equivalent of said polyglycidyl ether, said reaction being carried out by heating said polyglycidyl ether, dimerized fatty acids, and dehydrated castor oil fatty acids together at a temperature between 240° C. and 270° C. until the product has an acid number below 10.

References Cited

UNITED STATES PATENTS

| | | |
|---|---|---|
| 3,280,056 | 10/1966 | Masters. |
| 3,012,979 | 12/1961 | Stephens et al. |
| 3,010,920 | 11/1961 | Greenlee. |
| 3,001,959 | 9/1961 | Heck. |
| 2,970,983 | 2/1961 | Newey. |
| 2,934,506 | 4/1960 | Hicks et al. |
| 2,927,934 | 3/1960 | Greenspan et al. |
| 2,848,431 | 8/1958 | Dean et al. |
| 2,811,564 | 10/1957 | Bader. |
| 2,698,308 | 12/1954 | Crecelius. |
| 2,503,726 | 4/1950 | Greenlee. |

OTHER REFERENCES

Epoxy Resins; Lee-Neville; McGraw-Hill, New York, 1957, pp. 10–17 and 284–287.

DONALD E. CZAJA, *Primary Examiner.*

C. W. IVY, *Assistant Examiner.*